US012771542B2

United States Patent
(12) United States Patent
Goodman et al.

(10) Patent No.: US 12,771,542 B2
(45) Date of Patent: Oct. 20, 2026

(54) DEVICE ONBOARDING ON SECURE NETWORKS

(71) Applicant: Dell Products L.P., Round Rock, TX (US)

(72) Inventors: Bradley K. Goodman, Nashua, NH (US); William Jeffery White, Plano, TX (US)

(73) Assignee: Dell Products L.P., Round Rock, TX (US)

(*) Notice: Subject to any disclaimer, the term of this patent is extended or adjusted under 35 U.S.C. 154(b) by 407 days.

(21) Appl. No.: 18/352,007

(22) Filed: Jul. 13, 2023

(65) Prior Publication Data

US 2025/0023731 A1 Jan. 16, 2025

(51) Int. Cl.
*H04L 29/06* (2006.01)
*G06F 21/00* (2013.01)
*H04L 9/30* (2006.01)
*H04L 9/32* (2006.01)

(52) U.S. Cl.
CPC ............ *H04L 9/321* (2013.01); *H04L 9/3073* (2013.01)

(58) Field of Classification Search
CPC .............................. H04L 9/321; H04L 9/3073
See application file for complete search history.

(56) References Cited

U.S. PATENT DOCUMENTS 11,546,324 B1 * 1/2023 Brooker .................. H04L 63/20
12,041,059 B1 * 7/2024 Simic .................. H04L 63/0876
12,218,928 B2 * 2/2025 Panikkar ............. H04L 63/0823
2003/0236867 A1 * 12/2003 Natsuno .................. G06F 21/54 709/229
2011/0214165 A1 * 9/2011 Jeffreys ............... G06F 16/2471 726/5
2022/0116385 A1 * 4/2022 Hertrich ................ H04L 9/0825
2023/0252115 A1 * 8/2023 Ports, III ............... G06Q 40/03 726/1
2023/0337068 A1 * 10/2023 Van Wageningen ......................... H04W 12/04
2023/0412373 A1 * 12/2023 Sierra ................... H04L 9/0841
2024/0154794 A1 * 5/2024 Rao ....................... H04L 63/061

(Continued)

OTHER PUBLICATIONS

U.S. Appl. No. 18/352,359, filed in the name of Bradley K. Goodman et al. Jul. 14, 2023, and entitled "Device Authentication for Onboarding."

(Continued)

*Primary Examiner* — Lisa C Lewis
(74) *Attorney, Agent, or Firm* — Ryan, Mason & Lewis, LLP

(57) ABSTRACT

An apparatus comprises at least one processing device configured to receive one or more credentials for at least one device from an onboarding management system, and to receive a request from at least one authenticator to authenticate the at least one device in response to the at least one device requesting access to a secure communication channel to communicate with the onboarding management system. The at least one processing device is further configured to transmit the one or more credentials to the at least one authenticator in response to the request. The at least one device is given the access to the secure communication channel responsive to verification of the one or more credentials by the authenticator. The one or more credentials comprise one or more keys.

20 Claims, 7 Drawing Sheets

(56) References Cited

U.S. PATENT DOCUMENTS

| | | | | |
|---|---|---|---|---|
| 2024/0236807 | A1* | 7/2024 | Jaksa | H04W 40/12 |
| 2024/0388453 | A1* | 11/2024 | Zheng | H04L 63/18 |

OTHER PUBLICATIONS

W. Nilsen, "A Gentle Introduction to Asymmetric Encryption and SSL Certificates," https://dzone.com/articles/a-gentle-introduction-to-asymmetric-encryption-and, Aug. 9, 2022, 9 pages.

K. Brush et al., "Asymmetric Cryptography (public key cryptography)," https://www.techtarget.com/searchsecurity/definition/asymmetric-cryptography, Sep. 2021, 5 pages.

FIDO Alliance, "FIDO Device Onboard: A Specification for Automated, Secure loT Provisioning Technology," https://fidoalliance.org/intro-to-fido-device-onboard/, Apr. 20, 2021, 4 pages.

K. Brush et al., "Asymmetric Cryptography (public key cryptography)." https://www.techtarget.com/searchsecurity/definition/asymmetric-cryptography#:~:text=Asymmetric%20cryptography%2C%20also%20known%20as,from%20unauthorized%20access%20or%20use., Accessed Apr. 24, 2023, 5 pages.

R, Awati et al., "Certificate Authority (CA)," https://www.techtarget.com/searchsecurity/definition/certificate-authority, Accessed Apr. 20, 2023, 6 pages.

V. Fulber-Garcia, "Public/Private Keys Vs.Certificates," https://www.baeldung.com/cs/public-private-keys-vs-certificates, Mar. 16, 2023, 9 pages.

A. Woland, "How does certificate-based authentication work?" https://www.networkworld.com/article/2226498/infrastructure-management-simply-put-how-does-certificate-based-authentication-work.html, May 10, 2021, 8 pages.

Loginid, "FIDO Device Onboarding," https://docs.loginid.io/fdo/, Accessed Apr. 21, 2023, 3 pages.

FIDO Alliance, "Client to Authenticator Protocol (CTAP)," https://fidoalliance.org/specs/fido-v2.2-rd-20230321/fido-client-to-authenticator-protocol-v2.2-rd-20230321.html, Mar. 21, 2023, 132 pages.

U.S. Appl. No. 17/577,854, filed in the name of John Henry Terpstra et al. Jan. 18, 2022, and entitled "Multi-Phase Secure Zero Touch Provisioning of Computing Devices.".

U.S. Appl. No. 18/195,453, filed in the name of Emmanuel Andre et al. May 10, 2023, and entitled "Secure Communications Between Edge Clusters and Cluster Management System.".

* cited by examiner

DEVICE ONBOARDING ON SECURE NETWORKS

FIELD

The field relates generally to information processing, and more particularly to management of information processing systems.

BACKGROUND

Computing devices may be deployed to various customer or other end-user sites, such as "edge" computing sites or other computing sites which are remote from a management computing site operated by a manufacturer, vendor or other provider of such computing devices. In these and other cases, computing device onboarding is a complex task, particularly for computing devices that are to be provisioned remotely. Secure device onboarding processes may require a device to discover an onboarding service over a network, and the onboarding service to identify the device. However, with most networks, devices are not able to operate on the network until the device is deemed to have authorization to do so. With current approaches, there is an issue with obtaining network access for devices that need to be onboarded. This is a particularly difficult challenge with edge environments, where there is limited control over devices and networks, and varied parameters of operation.

SUMMARY

Illustrative embodiments of the present disclosure provide techniques for enabling secure communications between a computing device and an onboarding system.

In one embodiment, an apparatus comprises at least one processing device comprising a processor coupled to a memory. The at least one processing device is configured to receive one or more credentials for at least one device from an onboarding management system, and to receive a request from at least one authenticator to authenticate the at least one device in response to the at least one device requesting access to a secure communication channel to communicate with the onboarding management system. The at least one processing device is further configured to transmit the one or more credentials to the at least one authenticator in response to the request. The at least one device is given the access to the secure communication channel responsive to verification of the one or more credentials by the authenticator. The one or more credentials comprise one or more keys.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
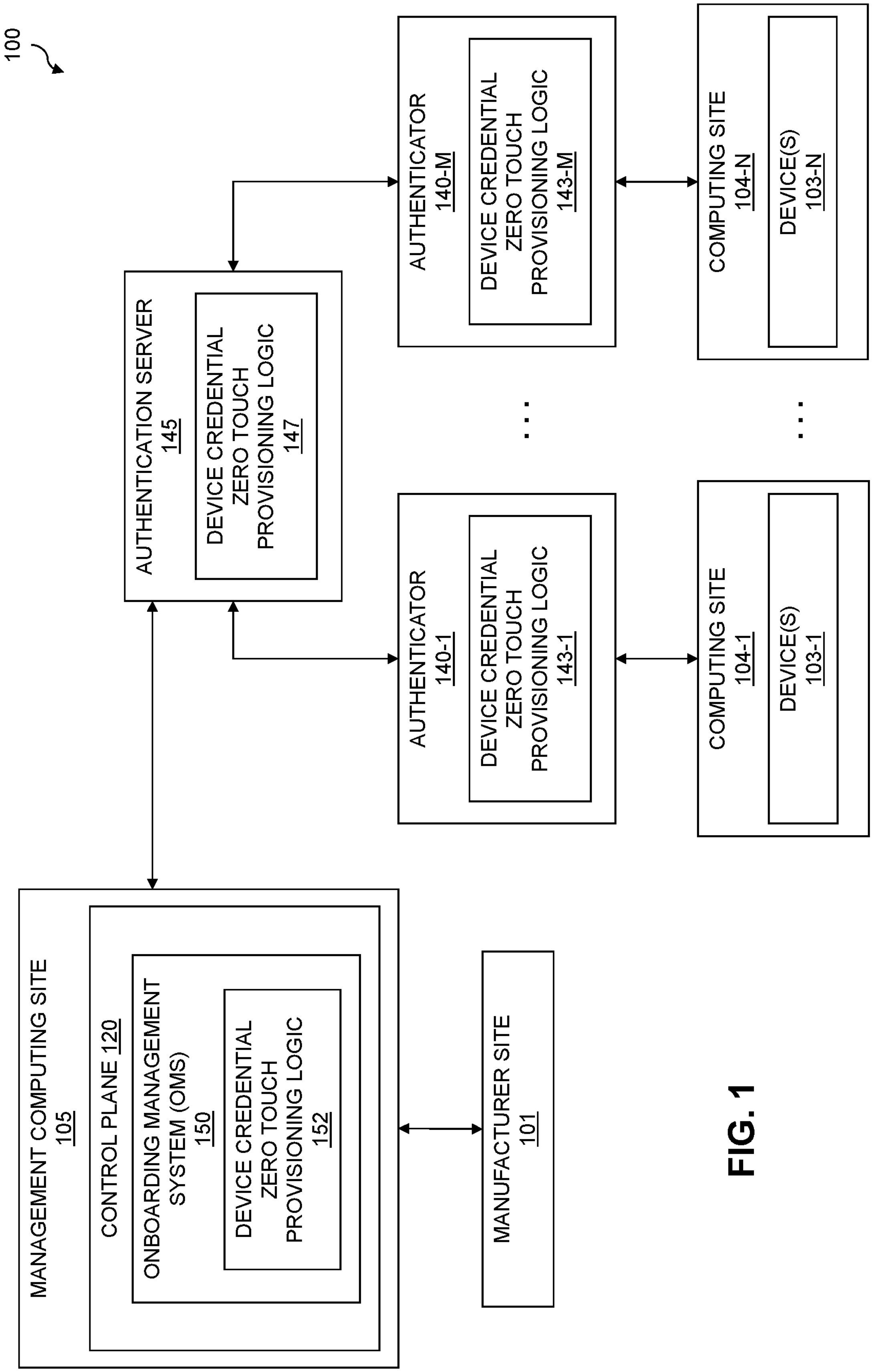
FIG. 1 is a block diagram of an information processing system configured for enabling secure communications between a computing device and an onboarding system in an illustrative embodiment.

FIG. 1 shows an information processing system 100 configured in accordance with an illustrative embodiment. The information processing system 100 is assumed to be built on at least one processing platform and provides functionality for enabling and maintaining secure communications between one or more computing sites 104-1, . . . 104-N (collectively, computing sites 104) and a management computing site 105. The computing sites 104 may be edge computing sites or other types of computing sites that may require a network connection to access the management computing site 105. In illustrative embodiments, each of the computing sites 104 comprises one or more devices 103-1, . . . 103-N (collectively, devices 103), which may be, for example, computing devices. As used herein, a "computing site" refers to a compute endpoint (e.g., edge compute endpoint (ECE)) comprising, but not necessarily limited to, servers, gateways and/or computers located at a location where computing occurs.

The computing sites 104 may represent different customer sites or other data centers or computing sites that are remote from the management computing site 105. In some embodiments, however, one or more of the computing sites 104 may be co-located with the management computing site 105 (e.g., at a same data center, a same cloud infrastructure, etc.). The management computing site 105 is assumed to comprise a plurality of devices or nodes (e.g., physical and virtual computing resources or other information technology (IT) assets not shown in FIG. 1) that implement a control plane 120 including an onboarding management system (OMS) 150 (e.g., onboarding service) providing device credential zero touch provisioning logic 152, enabling provisioning and configuration of sets of devices 103 deployed at the computing sites 104. As described in more detail herein, one or more authenticators 140-1, . . . , 140-M (collectively, authenticators 140) and an authentication server 145 are assumed to implement instances of device credential zero touch provisioning logic 143-1, . . . , 143-M (collectively, device credential zero touch provisioning logic 143) and device credential zero touch provisioning logic 147 that facilitate such provisioning of sets of devices 103 through secure communication with the control plane 120 of the management computing site 105. The instances of device credential zero touch provisioning logic 152, 147 and 143 may be, for example, software and/or firmware-based.

As used herein, "zero touch" provisioning refers to configuration or other provisioning of a computing device that does not require manual intervention. Thus, zero touch provisioning enables the computing device to be configured or otherwise provisioned without needing a human operator to physically type or otherwise provide input into a system console of the computing device being provisioned. As described in further detail below, zero touch provisioning in some cases only requires that a computing device be placed in some desired location and connected to power and be configured to connect to a network (e.g., either via a physical network cable or via a wireless network interface). Zero touch provisioning advantageously enables provisioning of a computing device remotely (e.g., from a control plane 120 of the management computing site 105) and automatically.

The devices 103 may comprise, for example, physical computing devices such as Internet of Things (IoT) devices, mobile telephones, laptop computers, tablet computers, desktop computers or other types of devices. Such devices are examples of what are more generally referred to herein as "processing devices." Some of these processing devices are also generally referred to herein as "computers." The devices 103 may also or alternately comprise virtualized computing resources, such as virtual machines (VMs), containers, etc.

The devices 103 in some embodiments comprise respective computers associated with a particular company, organization or other enterprise. In addition, at least portions of the system 100 may also be referred to herein as collectively comprising an "enterprise." Numerous other operating scenarios involving a wide variety of different types and arrangements of processing nodes are possible, as will be appreciated by those skilled in the art.

A manufacturer site 101 is connected to the management computing site 105. As explained in more detail herein, at the time of manufacture, device-specific credentials are created within the devices 103, and are shared with the device manufacturer in the form of private keys. In illustrative embodiments, asymmetric public keys corresponding to the private keys identifying the devices 103 (e.g., public keys of public-private key pairs) and ownership credentials are placed into a cryptographically attested digital document called an ownership voucher which identifies the device. As described in more detail in connection with FIG. 2 (see ownership voucher 253), the ownership voucher is sent to the management computing site 105. The management computing site 105 corresponds to an owner entity and its related systems and services through which a given device 103 is intended to operate. For example, device identity information captured at the time of manufacturing is made available to the owner entity (via management computing site 105), and any corresponding control planes and systems (e.g., control plane 120 and OMS 150).

Networks coupling the computing sites 104 with the authenticators 140 and/or the management computing site 105, coupling the authentication server 145 with the authenticators 140 and/or the management computing site 105 and/or coupling the manufacturer site 101 with the management computing site 105 are assumed to comprise a global computer network such as the Internet, although other types of networks can be used, including a wide area network (WAN), a local area network (LAN), a satellite network, a telephone or cable network, a cellular network, a wireless network such as a WiFi or WiMAX network, or various portions or combinations of these and other types of networks.

In some embodiments, the management computing site 105 and computing sites 104 collectively provide at least a portion of an information technology (IT) infrastructure operated by an enterprise. The IT infrastructure comprising the management computing site 105 and computing sites 104 may therefore be referred to as an enterprise system. As used herein, the term "enterprise system" is intended to be construed broadly to include any group of systems or other computing devices. In some embodiments, an enterprise system includes cloud infrastructure comprising one or more clouds (e.g., one or more public clouds, one or more private clouds, one or more hybrid clouds, combinations thereof, etc.). The cloud infrastructure may host at least a portion of the management computing site 105 and/or computing sites 104. A given enterprise system may host assets that are associated with multiple enterprises (e.g., two or more different businesses, organizations or other entities). For example, in some cases different ones of the computing sites 104 are associated with different enterprises (e.g., different customers or end-users) which purchase devices from another enterprise that is an operator of the management computing site 105 (e.g., a manufacturer or vendor of the devices 103 deployed at the computing sites 104).

Although not explicitly shown in FIG. 1, one or more input-output devices such as keyboards, displays or other types of input-output devices may be used to support one or more user interfaces to the management computing site 105 and computing sites 104, as well as to support communication between the management computing site 105, the computing sites 104, and other related systems and devices not explicitly shown.

When a computing site 104 is connected to a network, a zero touch onboarding process can be performed to connect the computing site to the management computing site 105 via a secure device onboard connection. However, as noted herein above, a device is not able to operate on a network until the device is authorized to do so. If a device 103 from a computing site 104 cannot access a network, the onboarding process does not occur. In illustrative embodiments, Fast ID Online (FIDO) Device Onboarding (FDO) is leveraged to enable zero touch onboarding, which is performed via firmware-based and/or runtime agents. The zero touch onboarding process provides a bootstrapping strategy enabling computing devices (e.g., devices 103) to securely obtain bootstrapping data with no installer action beyond physical placement and connecting network and power cables. As such, the zero touch onboarding processes enable non-technical personnel to bring up computing devices in remote locations without the need for any operator input. The zero touch onboarding processes provide functionality for updating a boot image, committing an initial configuration, and executing arbitrary scripts to address auxiliary needs on computing devices. The updated computing devices are subsequently able to establish secure connections with other systems. Zero touch onboarding processes provide a mechanism for defining a computing device's "good security posture" as described herein. For example, a bare-metal computing device holds a firmware-based secure boot ROM (e.g., a Universal Extensible Firmware Interface (UEFI) secure boot ROM), and the system as a whole is capable of TPM-based Integrity Measurement Architecture (IMA) for measuring boot security, where each boot stage is reported into the TPM's Platform Configuration Register (PCR) registers. IMA security may be defined using various Trusted Computing Group (TCG) Extensible Firmware Interface (EFI) Platform and Protocol specifications. With IMA security, it is possible to assure a high level of confidence regarding: (1) platform consistency and integrity (e.g., a failure of IMA will fail the boot process and initiate a recovery); and (2) device trustworthiness that can be communicated to the control plane.

Figure 2:
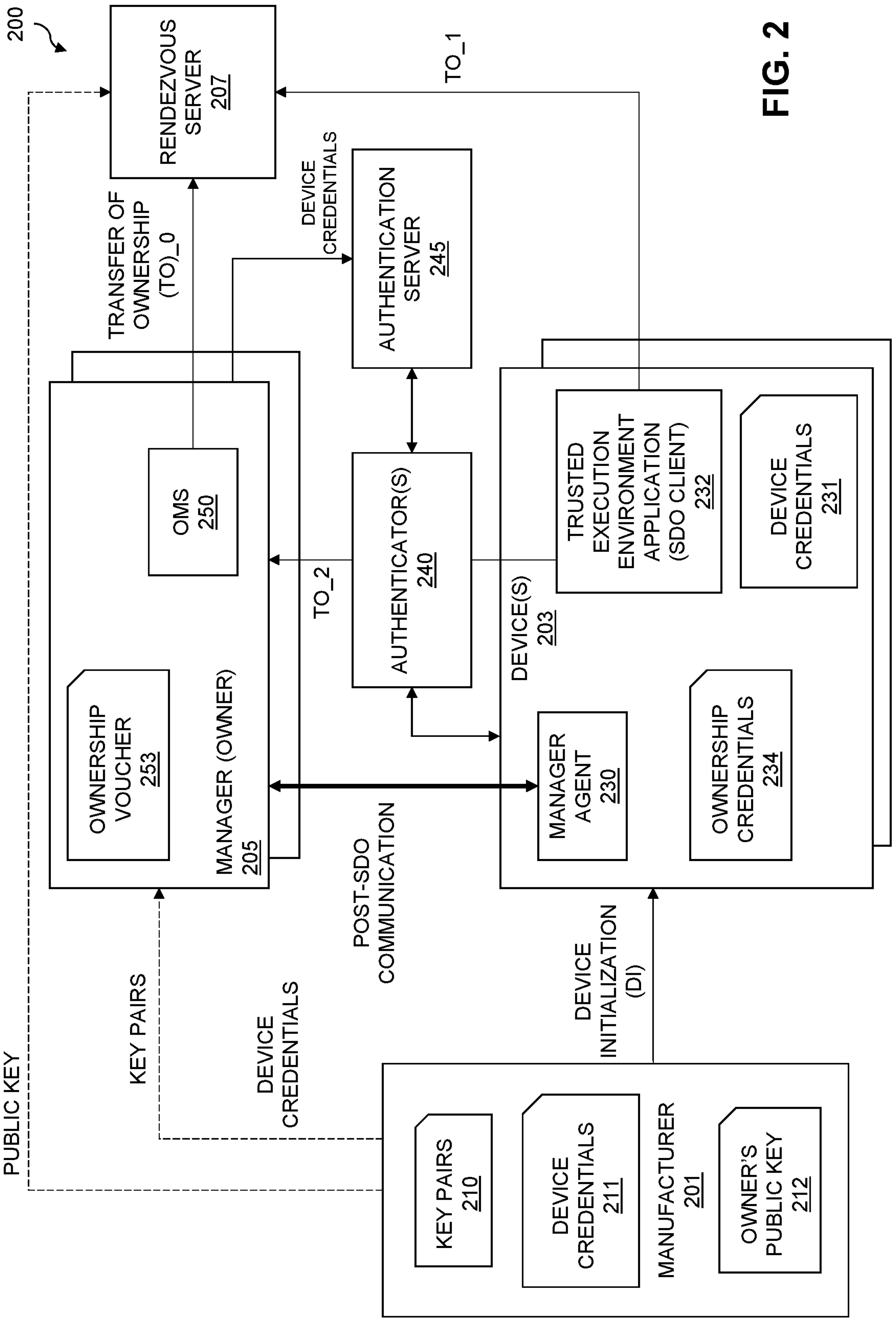
FIG. 2 shows a system flow for a secure device onboarding protocol that may be enabled utilizing zero touch provisioning in an illustrative embodiment.

FIG. 2 shows a system flow 200 for a secure device onboarding (SDO) protocol that may be enabled utilizing zero touch provisioning. Referring to FIG. 2, an FDO or other SDO protocol involves a manufacturer 201, one or more devices 203, a manager (or owner) 205, a rendezvous server 207, one or more authenticators 240 and an authentication server 245. The manufacturer 201 manufactures the devices 203. The manufacturer 201 has an associated key pair 210 and the owner's public key 212. The devices 203 implement a manager agent 230 and a trusted execution environment (TEE) application (e.g., an FDO/SDO client 232), and have ownership credentials 234. The manager 205 of the devices 203 implements an onboarding management system (OMS) 250 and has an ownership voucher 253 for each of the devices 203 provided to the manager 205 from the manufacturer 201. The devices 203 may be shipped from the manufacturer 201 (e.g., to one or more customer locations) independent of the ownership voucher 253, and ownership may be transferred multiple times until the devices 203 are powered on. The rendezvous server 207 enables multiple instances of the manager 205 to each register a range of devices which that manager 205 owns. Device initialization (DI) includes the key pair 210 of the manufacturer 201 being used to create an initial credential and ownership voucher. The manufacturer 201's certificate (e.g., the owner's public key 212) is published to the rendezvous server 207. A device string is configured by the manufacturer 201 and rendezvous server 207's uniform resource locator (URL). As used herein, a "certificate" refers to a data file that includes information for verifying the identity of a device (e.g., server, edge device (client)). The information includes, for example, the public key, an identification of the issuing authority of the certificate (e.g., certificate authority), and an expiration date of the certificate. A handshake refers to a process for verifying a certificate and a device's possession of the private key. The handshake can also establish how encryption will take place once the handshake is finished.

Figure 3:
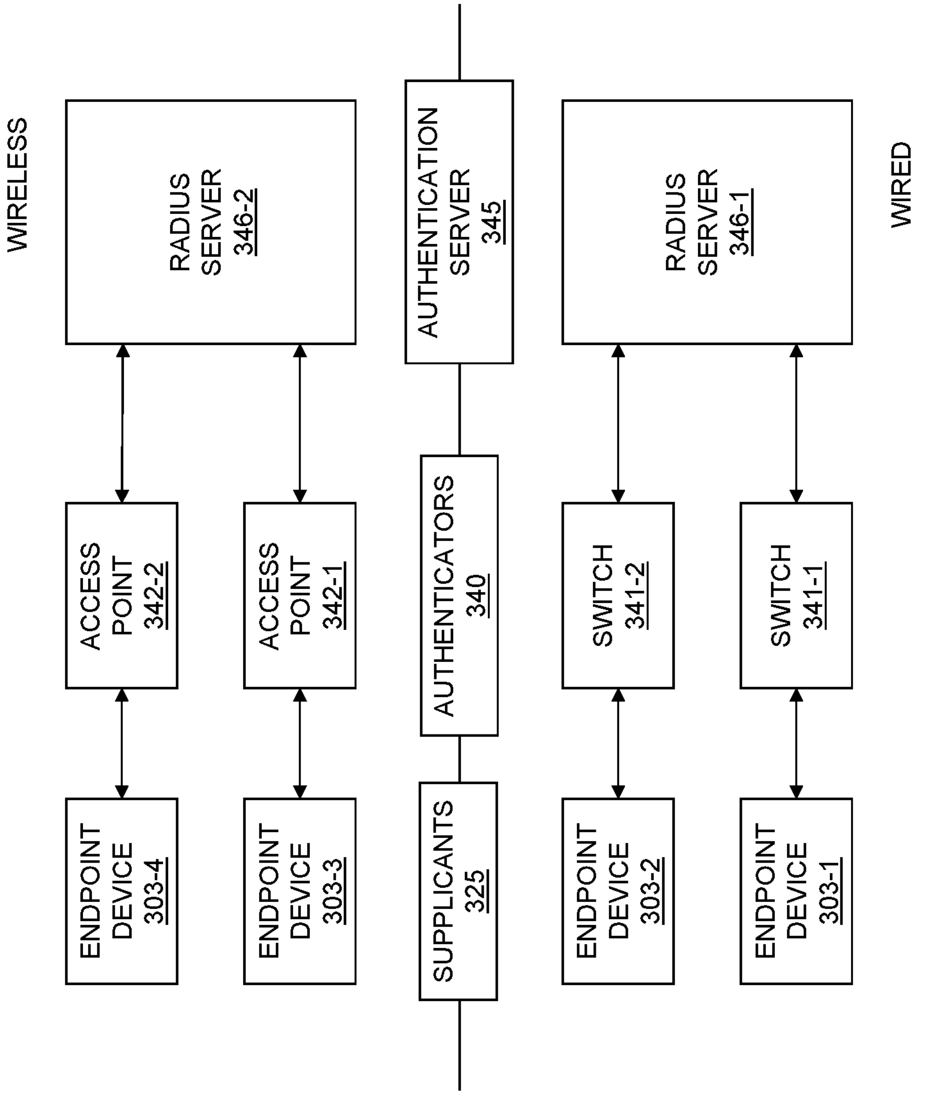
FIG. 3 is a block diagram depicting relationships between supplicants, authenticators and authentication servers in an illustrative embodiment.

In illustrative embodiments, the authenticator(s) 240 and authentication server 245 (which are the same or similar to the authenticators 140 and authentication server 145 in FIG. 1) are used to provide a secure network used for onboarding (also referred to herein as a secure communication channel) with established credentials of devices 203 that have been provided to the manager 205 in corresponding ownership vouchers 253. Referring, for example, to FIG. 3, port-based (wired) or wireless (e.g., WiFi) practices for enterprise network security are defined in standards such as, for example, Extensible Authentication Protocol (EAP), 802.1X, and remote authentication dial-in user service (RADIUS) protocol. Supplicants 325 can be broadly construed to refer to endpoint devices 303-1, 303-2, 303-3 and 303-4 (collectively endpoint devices 303) which are the same as or similar to devices 103 and 203, and are requesting access to the secure network used for onboarding. In order to be permitted to access the secure network, the endpoint devices 303 need to be authenticated by an authenticator before being permitted access to the network. Similarly, in FIGS. 1 and 2, the devices 103 and 203 are required to be authenticated by authenticators 140 and 240 before being given access to a secure network over which the devices 103 and 203 can communicate with OMS 150 and OMS 250. Since the devices 103, 203 and 303 are not permitted access to the secure network until such authentication is performed, the authenticator comprises or is a component of a switch or access point to which the devices 103, 203 and 303 are connected. For example, referring to FIG. 3, in a wired network, the authenticators 340 comprise switches 341-1 and 341-2 (collectively, switches 341) to which endpoint devices 303-1 and 303-2 are connected, and in a wireless network, the authenticators 340 comprise access points 342-1 and 342-2 (collectively, access points 342) to which endpoint devices 303-3 and 303-4 are connected. In illustrative embodiments, the authenticators 140, 240 and 340, using instances of device credential zero touch provisioning logic (e.g., device credential zero touch provisioning logic 143) communicate with authentication servers 145, 245 and 345, which may be centralized. The authentication servers through their own instances of device credential zero touch provisioning logic (e.g., device credential zero touch provisioning logic 147) may maintain credentials for each of the devices 103, 203 and 303 allowed access to the secure network. The device credentials may comprise, for example, passwords for password-based authentication and/or public-private asymmetric key pairs for key-based authentication. For example, in illustrative embodiments, the authentication servers 145, 245 and 345 store and provide public keys of public-private asymmetric key pairs received from the OMS 150/250 for key-based authentication to the authenticators 140, 240 and 340 in response to devices 103, 203 and 303 requesting access to the secure network. In example embodiments, the authentication servers 345 (or 145 and 245) can comprise RADIUS servers 346-1 and 346-2 (collectively, RADIUS servers 346). As can be understood, the RADIUS servers 346 utilize the RADIUS protocol.

Referring back to FIG. 2, the manufacturer 201 is connected to the manager 205. At the time of manufacture, device credentials 231 specific to the devices 203 are created within the devices 103, and are shared with the manufacturer 201 (device credentials 211) in the form of, for example, private keys. In illustrative embodiments, the asymmetric public keys corresponding to the private keys identifying the devices 203 (e.g., public keys of public-private key pairs) (e.g., device credentials 211) and ownership credentials 234 are placed into a cryptographically attested digital document called an ownership voucher 253, which identifies a given device 203. The ownership voucher 253 is sent to manager 205 so that when a given device 203 is ready to be onboarded, the device 203 can be verified. In other words, any device identity information captured at the time of manufacturing (e.g., in the form of public keys of public-private key pairs) is made available to the manufacturer 201 and its associated control planes and systems in which the corresponding devices 203 will operate.

In illustrative embodiments, device credentials 211/231 include a private key that is provisioned into a given device 203 (e.g., when a CPU or motherboard is manufactured) for establishing trust for a restricted operating environment (ROE) that runs on the device. A digital signature by the private key provides evidence of code being executed in the ROE. The ownership credentials 234 comprise, for example, a key pair 210 that serves to identify a current owner of a given device 203. When a device 203 is manufactured, the manufacturer 201 uses the key pair 210 as an initial ownership credential 234, which is replaceable with a new ownership credential 234 when ownership is transferred.

As noted herein above, the illustrative embodiments advantageously address the issue of enabling device 203 to have network access to communicate with the OMS 250 and execute the onboarding process. For example, according to the embodiments, the device credentials 211/231, which include public keys corresponding to the private keys created during device initialization (DI), are shared with the manager 205 in the ownership voucher 253 prior to onboarding, and are subsequently shared with the authentication server 245. As a result, when a device 203 powers on for the first time in a manager environment (e.g., on the manager 205's network), the device credentials 211/231 (e.g., in the form of the public keys) would be presented by the authentication server 245 to its corresponding authenticator 240, thus allowing the authenticator 240 to verify the device 203 so the device 203 can use the network (e.g., secure communication channel) to communicate with the OMS 250 on the network. The OMS 250 shares the device credentials 211/231 with the authentication server 245 using, for example, RADIUS proxy capability, which may be available on WiFi access points.

Figure 5:
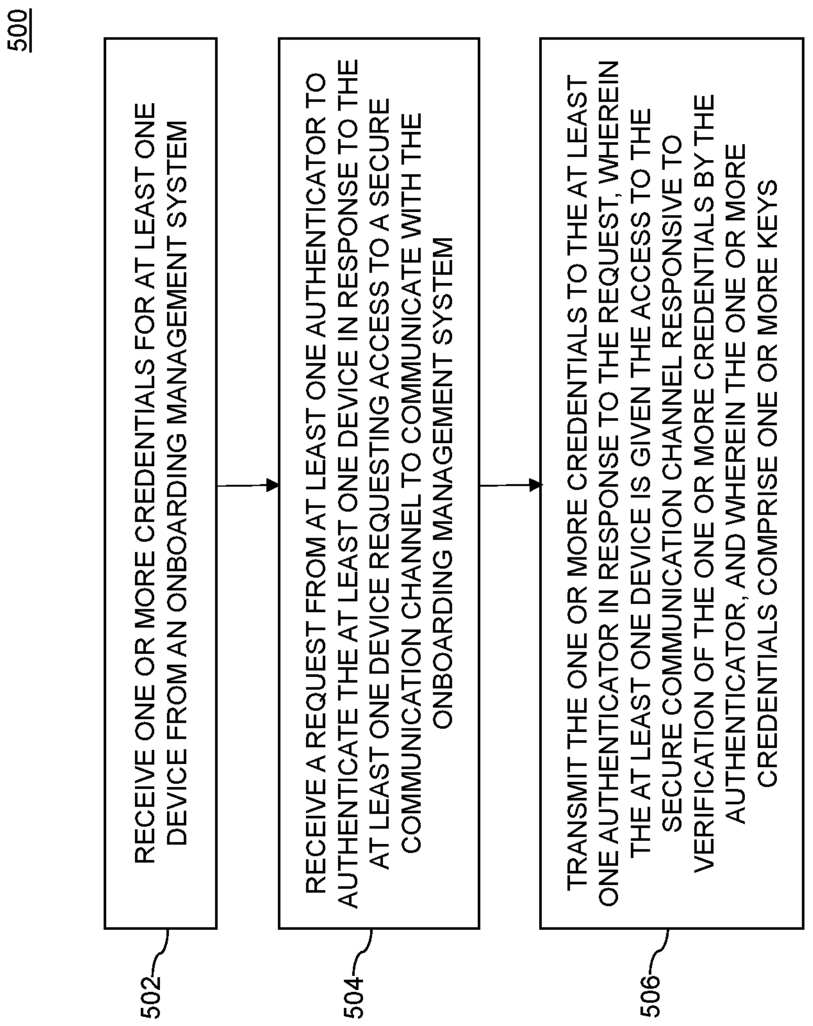
FIG. 5 is a flow diagram of an exemplary process for enabling secure communications between a computing device and an onboarding system in an illustrative embodiment.

An exemplary process for enabling secure communications between a computing device and an onboarding system will now be described in more detail with reference to the flow diagram of FIG. 5. It is to be understood that this particular process is only an example, and that additional or alternative processes for enabling secure communications between a computing device and an onboarding system may be used in other embodiments.

In this embodiment, the process 500 includes steps 502 through 506. These steps are assumed to be performed by one or more elements of the management computing site 105/manager 205, authentication server 145/245, authenticator 140/240, devices 103/203 or other elements described in the information processing system 100 or system flow 200. The process begins with step 502, receiving (e.g., by the authentication server 145/245) one or more credentials (e.g., device credentials 211/231) for at least one device (e.g., device 103/203) from an OMS (e.g., OMS 150/250). As noted herein, the OMS 150/250 receives the one or more credentials as part of a cryptographically attested digital document (e.g., ownership voucher 253) from, for example, a site corresponding to the manufacturer 201 (e.g., manufacturer site 101) of the at least one device. In step 504, the authentication server 145/245, for example, receives a request from at least one authenticator (e.g., authenticator 140/240) to authenticate the at least one device in response to the at least one device requesting access to a secure communication channel to communicate with the OMS. This may be, for example, in response to a device 103/203 powering on and communicating with an authenticator 140/240. In step 506, the one or more credentials are transmitted to the at least one authenticator in response to the request. The at least one device is given the access to the secure communication channel responsive to verification of the one or more credentials by the authenticator.

As noted herein above, the one or more credentials (e.g., device credentials 211/231) comprise one or more keys, wherein the keys are, for example, asymmetric public keys of public-private key pairs. As noted herein above, the one or more keys may include a device attestation key. FDO or other SDO protocol may define a device attestation key which uniquely identifies, and is used to validate a device for secure onboarding purposes. The illustrative embodiments allow for conveyance of this same key to an authentication server for use as a broader network credential. This would work in cases in which this key was compatible with the types and formats allowed for the network authentication scheme being used. In other words, the device attestation key may function as a multi-purpose key used: (i) for validating the at least one device for secure onboarding; and (ii) as a network credential to provide the at least one device with the access to the secure communication channel. In some cases, the multi-purpose key (e.g., device attestation key) is used as the network credential to provide the at least one device with the access to the secure communication channel only in connection with the secure onboarding of the at least one device, and then is discarded (e.g., not used for another purpose or other operations). In other cases, the multi-purpose key is used as the network credential to provide the at least one device with the access to the secure communication channel in connection with the secure onboarding and for post-secure onboarding operations (e.g., as a network credential for providing additional access to the secure communication channel in connection with operations after the secure onboarding of the at least one device). For example, in some cases a device attestation key can be designed to be used only for onboarding, after which it is no longer used, applied, or retained. However, in other cases, in illustrative embodiments, the device attestation key is used throughout the lifecycle of the device 103/203 as a network credential or for other purposes.

In other illustrative embodiments, a key other than the device attestation key is created for the specific purpose of being used as a network credential to provide the at least one device with the access to the secure communication channel. For example, the specific-purpose key is used as the network credential to provide the at least one device with the access to the secure communication channel only in connection with the secure onboarding of the at least one device and then is no longer used, applied, or retained.

In some cases, an implementation might not use an onboarding credential (e.g., device attestation key) as a network credential or for longer-term use beyond device onboarding. An onboarding credential (e.g., device attestation key) may be in a form which is incompatible with keys able to be used by the authentication server 145, authenticator 140 and/or network infrastructure. For example, the number of required bits for a key may differ between platforms. In some cases, an onboarding credential (e.g., device attestation key) may be configured for one-time use and have a designated time for which the key remains valid and usable. In illustrative embodiments, one or more, separate, longer-lived credentials could be created specifically for the purpose of being used as a network credential by a given device 103/203.

In an illustrative embodiment, in receiving the one or more credentials for the at least one device from the OMS 150/250, an authentication server 145/245 through, for example, device credential zero touch provisioning logic 147, may be configured to pull the one or more credentials from a backend service associated with the OMS 150/250 in response to receiving the request from the authenticator 140/240 to authenticate the at least one device. Additionally, or alternatively, in receiving the one or more credentials for the at least one device from the OMS, an authentication server 145/245 through, for example, device credential zero touch provisioning logic 147, may be configured to allow the one or more credentials to be pushed to the authentication server 145/245 from the OMS 150/250 at designated times, periodically and/or upon receipt of the credentials by the OMS 150/250. Depending on the implementation and/or specific protocols of an authentication server 145/245, an authentication server 145/245 may allow new credentials to be pushed to it, or be configured to query a backend service (as it may do with lightweight directory access protocol (LDAP)) when an authentication request is made by the authenticator 140/240.

Transfer of ownership (TO) will now be described in more detail. TO may involve multiple steps or phases, denoted TO_0, TO_1 and TO_2. In TO_0, the OMS 250 has the device ID, ownership voucher 253, private key and IP address of the manager 205. The OMS 250 registers with the rendezvous server 207 using the device ID and ownership voucher 253. The rendezvous server 207 verifies the manufacturer 201's public key from the ownership voucher 253, and sets a timer to wait for TO_1. If a device 203 does not contact the rendezvous server 207 within a set time interval, the rendezvous server 207 clears registration and the OMS 250 must repeat TO_0. TO_1 includes the device 203 contacting the rendezvous server 207 with the device ID, and the rendezvous server 207 returning the manager's URL. TO_2 includes the device 203 reaching out to the OMS 250. The manager 205 proves possession of the private key to the device 203, and sends the ownership voucher 253 to the device 203. The device 203 verifies the chain of trust in the ownership voucher 253, and the manager 205 resets the credentials. The manager 205 and device 203 may then perform any required post-SDO communication.

The rendezvous server 207 may provide various discovery options, including those specified in: Internet Engineering Task Force (IETF) Request for Comments (RFC) 8572 Secure Zero Touch Provisioning (SZTP)—DHCP option via 143 SZTP server address; IETF RFC 8552 Scoped Interpretation of DNS Resource Records through "Underscored" Naming of Attribute Leaves—DNS resource record locator; etc. In some embodiments, the rendezvous server 207 may have URLs "rendezvous.customer.com" and "rendezvous-.provider.com" where "provider" may be the name of the manufacturer 201, the manager 205, etc. For air-gapped devices, Yubico® or a 4G-enabled gateway may be utilized. Yubico Yubikey®, for example, may utilize OpenPGP, Open Authentication Time-Based One-Time Password (OATH-TOTP), a Personal Identity Verification (PIV) smartcard interface, FIDO Universal 2nd Factor Authentication (U2F) or FIDO2, and configuration sets for enabling authentication in air-gapped device scenarios.

Figure 4:
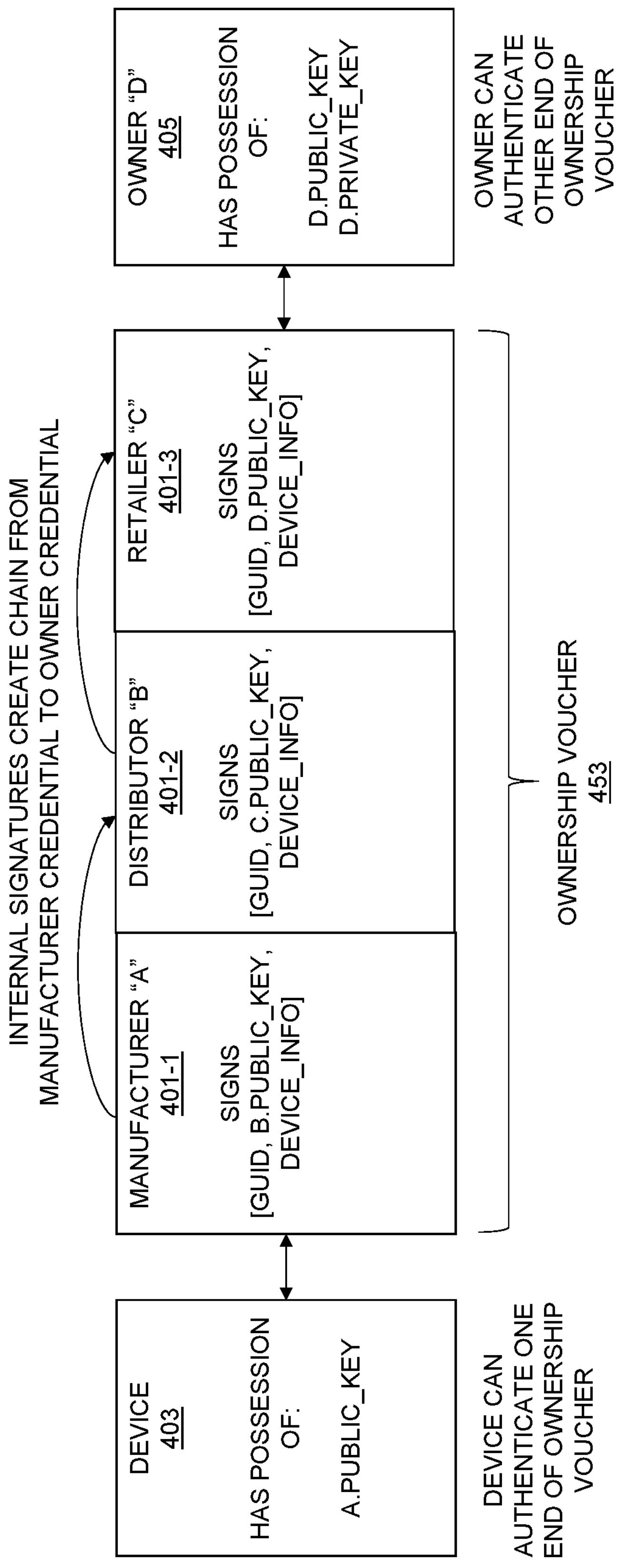
FIG. 4 shows generation of an ownership voucher utilized in secure device onboarding of computing devices in an illustrative embodiment.

FIG. 4 illustrates details of an ownership voucher 453 that is processed by a manufacturer "A" 401-1, a distributor "B" 401-2, and a retailer "C" 401-3. The manufacturer 401-1, distributor 401-2, and retailer 401-3 provide internal signatures which create a chain from the manufacturer to owner credential in the ownership voucher. The manufacturer 401-1 signs the ownership voucher 453 with [GUID, B.Public_Key, Device_Info], the distributor 401-2 signs the ownership voucher 453 with [GUID, C.Public_Key, Device_Info], and the retailer 401-3 signs the ownership voucher 453 with [GUID, D.Public_Key, Device_Info]. The device 403 can authenticate one end of the ownership voucher 453, as it has possession of A.Public_Key. The owner "D" 405 can authenticate the other end of the ownership voucher 453, as it has possession of D.Public_Key and D.Private_Key. The ownership voucher 453 is a structured digital document that links the manufacturer 401-1 with the owner 405, and includes a chain of signed public keys. Each signature of a public key authorizes the possessor of the corresponding private key to take ownership of the device 403 or pass ownership through another link in the chain. The signatures in the ownership voucher 453 thereby create a chain of trust from the manufacturer 401-1 to the owner 405.

Ownership voucher signing includes initializing a TEE with a hash of the manufacturer 401-1 public key (A.Public_Key). Voucher signing includes encoding the owner 405's public key and signing using the manufacturer 401-1's private key, and updating the ownership voucher 453. The first transfer (e.g., from a first owner to a second owner) of the ownership voucher 453 includes encoding the second owner's public key and signing using the first owner's private key, and updating the voucher. In the FIG. 4 example, the transfer between the manufacturer 401-1 and the distributor 401-2 would thus include the manufacturer 401-1 encoding the distributor 401-2's public key (B.Public_Key) and signing using the manufacturer 401-1's private key (A.Private_Key). Similar processing would be utilized for transfer of the ownership voucher 453 from the distributor 401-2 to the retailer 401-3, and so on.

Verification of the ownership voucher 453 may proceed as follows. The owner 405 may sign a nonce using its private key (D.Private_Key), and send the ownership voucher 453 with the signature (the signed nonce) to the device 403. The device 403 verifies the nonce using the owner 405's public key (D.Public_Key), which verifies that the owner 405 has the corresponding private key (D.Private_Key). The device 403 then gets the manufacturer 401-1's public key (A.Public_Key) from the first entry of the ownership voucher 453, and verifies the hash of the manufacturer 401-1's public key stored in its TEE. The device 403 can then verify the signatures of the ownership voucher 453 in sequence, until it comes to the owner 405's public key (D.Public_Key), which is the last entry of the ownership voucher 453. This means that the chain of ownership is trusted.

Databases or data stores for maintaining keys, credentials, ownership vouchers, etc., may be implemented using one or more of storage systems that are part of or otherwise associated with one or more of the information processing system 100 and/or system flow 200. The storage systems may comprise a scale-out all-flash content addressable storage array or other type of storage array. The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage. Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

The embodiments advantageously provide for the use of a secure onboarding payload (e.g., an ownership voucher) to convey keys that are created on a device at manufacturing time to an authentication server for the purpose of giving the device access to a secured network to effectuate automatic secure onboarding of the device. Unlike conventional approaches, which may require manual entry of device credentials onto a network or of network credentials onto a device, the embodiments configure a secure onboarding agent (e.g., OMS 150/250) to interact directly with an authentication server for the purpose of authorizing new machines on a network in an automated fashion. In some embodiments, an authentication server may be provided with an ownership voucher in its entirety, allowing the authentication server to independently vet the contents of the ownership voucher to assess if a given device 103/203 should be allowed access to a network. In this case, the authentication server includes a public verification key and is configured to use the public verification key to verify whether the ownership voucher is valid. The ownership voucher is digitally signed with a private key corresponding to the public verification key so that the public verification key can be used to verify the ownership voucher based on the corresponding private key. In some cases, the authentication server may be onboarded by a secure onboarding agent. As a result of the onboarding of the authentication server, the public verification key for performing the verifying of whether the ownership voucher is valid is automatically generated for and provided to the authentication server. For example, the authentication server can be onboarded to an SDO platform with a RADIUS service as an application above an edge platform. Critical onboarding keys can be shared without a proxy function to a rendezvous server. The keys can be placed in the authentication server once enrolled and deployed.

As an additional advantage, illustrative embodiments permit use of a secure onboarding credential (e.g., device attestation key) as a network credential and/or the capability to create a separate, network-specific credential at manufacturing time to be placed in an ownership voucher for conveyance to management computing site 105/manager 205 and ultimately to an authentication server 145/245 in a secure onboarding process. Depending on implementation, secure onboarding credentials and/or generated credentials can be used for authorizing a device to access a limited network only for the purposes of secure onboarding or for long-term use as a network credential.

As a further advantage, since edge devices may be managed by non-information technology (non-IT) personnel, the embodiments employ zero touch provisioning to onboard devices to the management computing site 105 (or manager 205). With zero touch provisioning, a computing site 104 (e.g., ECE) configures and onboards itself automatically without user intervention. The embodiments advantageously provide technical solutions to enable automated access by devices 103/203 to secure networks to perform SDO processes with zero touch provisioning.

Referring back to FIGS. 1 and 2, although there are elements that are depicted as being part of the management computing site 105 and manager 205 in the FIG. 1 and the FIG. 2 embodiments, such elements or at least a portion thereof may in other embodiments be implemented at least in part externally to the management computing site 105 or manager 205, for example, as a stand-alone server, set of servers or other type of system coupled via one or more networks to the management computing site 105 and/or manager 205.

The management computing site 105/manager 205, authenticator 140/240, authentication server 145/245, OMS 150/250, devices 103/203 in the FIG. 1 and the FIG. 2 embodiments are assumed to be implemented using at least one processing device. Each such processing device generally comprises at least one processor and an associated memory, and implements at least a portion of the functionality of, for example, the device credential zero touch provisioning logic 143, 147 and 152 of the authenticator 140/240, authentication server 145/245 and OMS 150/250.

It is to be appreciated that the particular arrangement of the management computing site 105/manager 205, authenticator 140/240, authentication server 145/245, OMS 150/250, devices 103/203 illustrated in the FIG. 1 and the FIG. 2 embodiments is presented by way of example only, and alternative arrangements can be used in other embodiments. As discussed above, for example, elements that are depicted as being part of the management computing site 105 and manager 205 in the FIG. 1 and the FIG. 2 embodiments may be implemented at least in part external to the management computing site 105 and manager 205. At least portions of the device credential zero touch provisioning logic 143, 147 and 152 of the authenticator 140/240, authentication server 145/245 and OMS 150/250 may be implemented at least in part in the form of software that is stored in memory and executed by a processor.

It is to be understood that the particular set of elements shown in FIGS. 1 and 2 are presented by way of illustrative example only, and in other embodiments additional or alternative elements may be used. Thus, another embodiment may include additional or alternative systems, devices and other network entities, as well as different arrangements of modules and other components.

The management computing site 105/manager 205, authenticator 140/240, authentication server 145/245, OMS 150/250, devices 103/203 and other portions of the system 100 and system flow 200, as described above and in further detail below, may be part of a cloud infrastructure.

The management computing site 105/manager 205, authenticator 140/240, authentication server 145/245, OMS 150/250, devices 103/203 and other components of the information processing system 100 and system flow 200 in the FIG. 1 and the FIG. 2 embodiments are assumed to be implemented using at least one processing platform comprising one or more processing devices each having a processor coupled to a memory. Such processing devices can illustratively include particular arrangements of compute, storage and network resources.

The management computing site 105/manager 205, authenticator 140/240, authentication server 145/245, OMS 150/250, devices 103/203, or components thereof, may be implemented on respective distinct processing platforms, although numerous other arrangements are possible.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 and system flow 200 are possible, in which certain components of the system reside in one data center in a first geographic location while other components of the system reside in one or more other data centers in one or more other geographic locations that are potentially remote from the first geographic location. Thus, it is possible in some implementations of the system 100 and system flow 200 for the management computing site 105/manager 205, authenticator 140/240, authentication server 145/245, OMS 150/250, devices 103/203, or portions or components thereof, to reside in different data centers. Numerous other distributed implementations are possible.

Additional examples of processing platforms utilized to implement the management computing site 105/manager 205, authenticator 140/240, authentication server 145/245, OMS 150/250, devices 103/203 and/or other components of the system 100 and system flow 200 in illustrative embodiments will be described in more detail below in conjunction with FIGS. 6 and 7. It is to be appreciated that these and other features of illustrative embodiments are presented by way of example only, and should not be construed as limiting in any way.

In some embodiments, in addition to the security protocols discussed herein, one or more secure connections may also utilize, for example, one or more of a private Virtual Private Network (VPN), Internet Protocol Security (IPsec), encrypted Virtual Local Area Network (VLAN), secured Secure Shell (SSH), Hypertext Transfer Protocol Secure (HTTPS), Hypertext Transfer Protocol (HTTP) Strict-Transport-Security (HSTS) if it is feasible to do so.

In some embodiments, the provisioning and/or secure connections may conform to various platform security standards, such as National Institute of Standards and Technology (NIST) Special Publication (SP)-800-193 Platform Firmware Resiliency Guidelines, NIST SP-800-207 Zero Trust Architecture, Federal Information Processing Standards Publication (FIPS) 140-3 Security Requirements for Cryptographic Modules, and International Standards Organization (ISO) 28000:2007 Specification for security management systems for the supply chain, etc. The provisioning and/or secure connection processing described herein further enables device integrity assurance functionality, including but not limited to: device tamper detection; boot attestation from Power-On Self-Test (POST) through operating system (OS) hand-over; continuous Chain-of-Trust from POST via TPM; secure boot with end-to-end cryptographic support; OS Machine Owner Key (MOK) cryptographically signed key to device only; OS boot processes which cannot be interrupted or intercepted; hardware configuration change detection and notification; measured boot processing; FIDO compliant secure on-boarding; trusted execution environment (e.g., meeting NIST SP-800-207 Zero Trust Architecture specifications); etc.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for enabling secure communications between computing devices and an onboarding system will now be described in greater detail with reference to FIGS. 6 and 7. Although described in the context of system 100 and system flow 200, these platforms may also be used to implement at least portions of other information processing systems in other embodiments.

Figure 6:
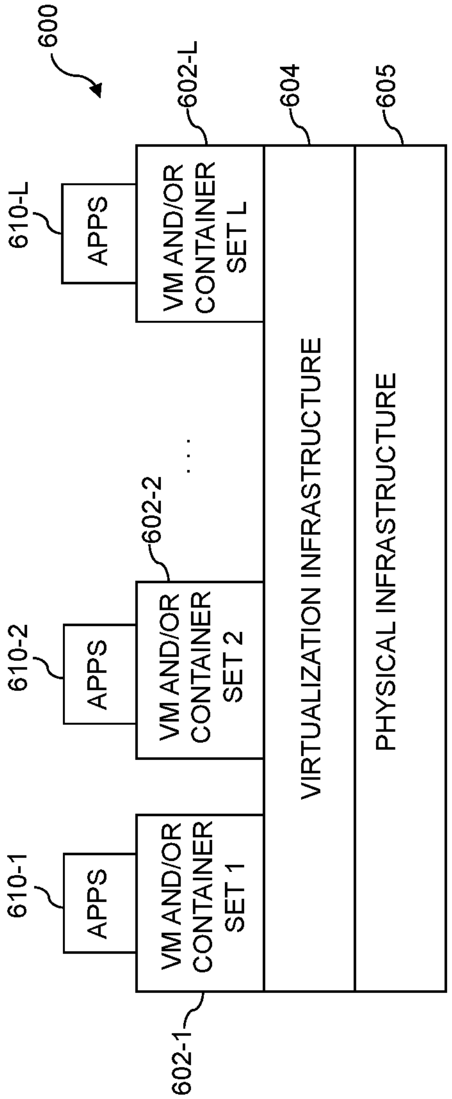
FIGS. 6 and 7 show examples of processing platforms that may be utilized to implement at least a portion of an information processing system in illustrative embodiments.
Figure 7:
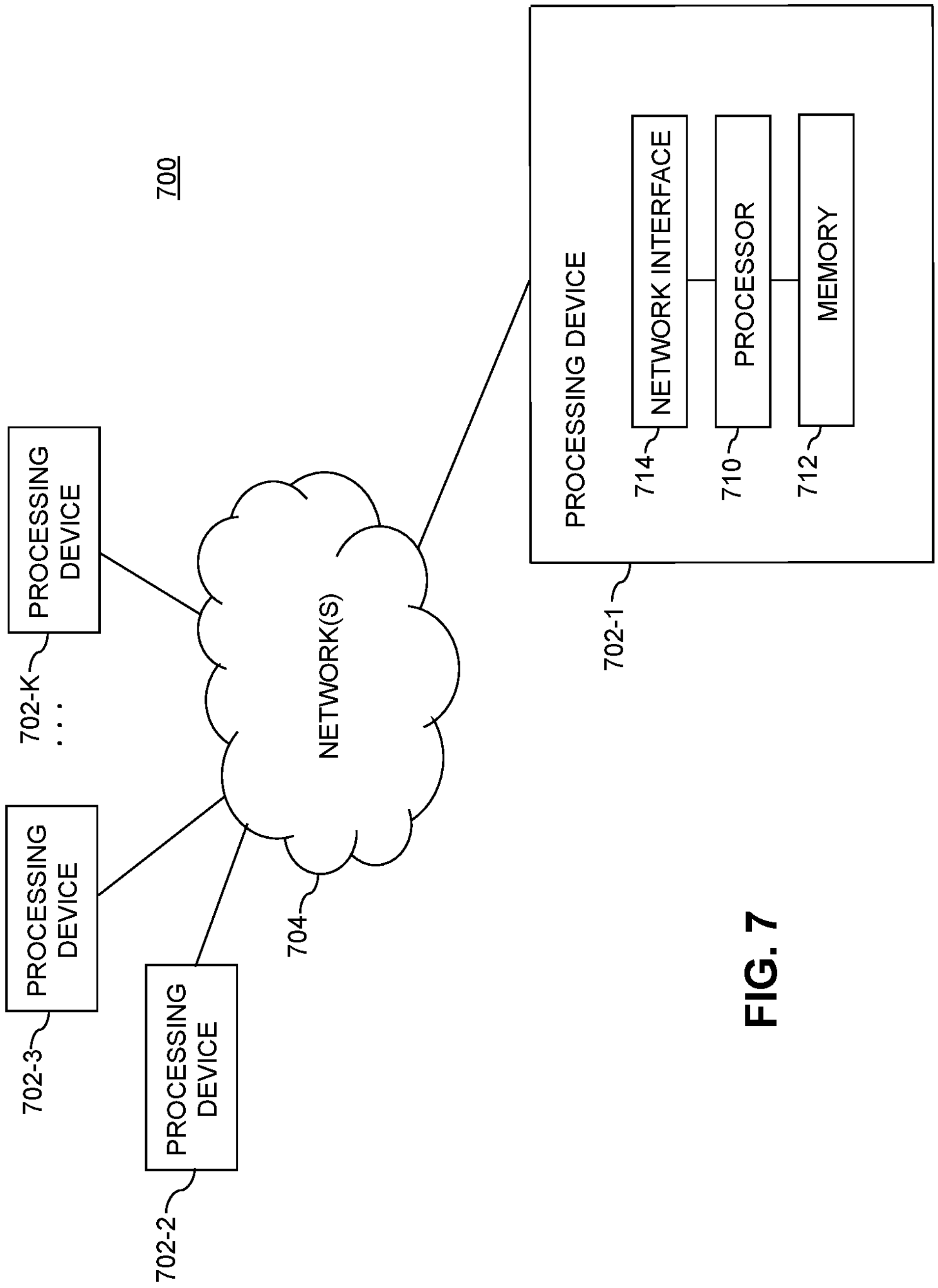

FIG. 6 shows an example processing platform comprising cloud infrastructure 600. The cloud infrastructure 600 comprises a combination of physical and virtual processing resources that may be utilized to implement at least a portion of the information processing system 100 and system flow 200 in FIGS. 1 and 2. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 may comprise respective VMs, respective sets of one or more containers, or respective sets of one or more containers running in VMs.

In some implementations of the FIG. 6 embodiment, the VMs/container sets 602 comprise respective VMs implemented using virtualization infrastructure 604 that comprises at least one hypervisor. A hypervisor platform may be used to implement a hypervisor within the virtualization infrastructure 604, where the hypervisor platform has an associated virtual infrastructure management system. The underlying physical machines may comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 and system flow 200 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and system flow 200 and includes a plurality of processing devices, denoted 702-1, 702-2, 702-3, . . . 702-K, which communicate with one another over a network 804.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 712 may comprise random access memory (RAM), read-only memory (ROM), flash memory or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers. The other processing devices 702 of the processing platform 700 are assumed to be configured in a manner similar to that shown for processing device 702-1 in the figure.

Again, the particular processing platform 700 shown in the figure is presented by way of example only, and system 100 and system flow 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure. It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for enabling secure communications between computing devices and an onboarding system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computing devices, provisioning processes, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:

at least one processing device comprising a processor coupled to a memory;

the at least one processing device executing a zero touch provisioning process which operates to:

receive one or more credentials for at least one device from an onboarding management system, the one or more credentials comprising one or more keys which identify the at least one device and an owner of the at least one device;

receive a request from at least one authenticator to authenticate the at least one device in response to the at least one device requesting access to a secure communication channel to communicate with the onboarding management system to perform a zero touch provisioning process; and transmit the one or more credentials to the at least one authenticator in response to the request to cause the at least one authenticator to utilize the one or more credentials to verify the identity and the owner of the at least one device and provide the at least one device access to the secure communication channel in response to verification of the identity and owner of the at least one device by the at least one authenticator.

2. The apparatus of claim 1 wherein the one or more keys comprise at least an asymmetric public key of a public-private key pair.

3. The apparatus of claim 1 wherein the onboarding management system receives the one or more credentials as part of a cryptographically attested digital document from a site corresponding to a manufacturer of the at least one device.

4. The apparatus of claim 1 wherein the at least one processing device comprises a server utilizing a remote authentication dial-in user service protocol.

5. The apparatus of claim 1 wherein the one or more keys comprise a multi-purpose key used: (i) for validating the at least one device for secure onboarding; and (ii) as a network credential to provide the at least one device with the access to the secure communication channel.

6. The apparatus of claim 5 wherein the multi-purpose key comprises a device attestation key.

7. The apparatus of claim 5 wherein the multi-purpose key is used as the network credential to provide the at least one device with the access to the secure communication channel only in connection with the secure onboarding of the at least one device.

8. The apparatus of claim 5 wherein the access comprises initial access to the secure communication channel in connection with the secure onboarding of the at least one device and additional access to the secure communication channel in connection with operations after the secure onboarding of the at least one device.

9. The apparatus of claim 5 wherein the one or more keys comprise a specific-purpose key used as a network credential to provide the at least one device with the access to the secure communication channel.

10. The apparatus of claim 9 wherein the specific-purpose key is used as the network credential to provide the at least one device with the access to the secure communication channel only in connection with the secure onboarding of the at least one device.

11. The apparatus of claim 1 wherein, in receiving the one or more credentials for the at least one device from the onboarding management system, the at least one processing device is configured to pull the one or more credentials from a backend service associated with the onboarding management system in response to receiving the request from the at least one authenticator.

12. The apparatus of claim 1 wherein, in receiving the one or more credentials for the at least one device from the onboarding management system, the at least one processing device is configured to allow the one or more credentials to be pushed to the at least one processing device from the onboarding management system.

13. A computer program product comprising a non-transitory processor-readable storage medium having stored therein program code of one or more software programs, wherein the program code when executed by at least one processing device causes the at least one processing device to perform a zero touch provisioning process which comprises steps of:

receiving one or more credentials for at least one device from an onboarding management system, the one or more credentials comprising one or more keys which identify the at least one device and an owner of the at least one device;

receiving a request from at least one authenticator to authenticate the at least one device in response to the at least one device requesting access to a secure communication channel to communicate with the onboarding management system to perform a zero touch provisioning process; and transmitting the one or more credentials to the at least one authenticator in response to the request to cause the at least one authenticator to utilize the one or more credentials to verify the identity and the owner of the at least one device and provide the at least one device access to the secure communication channel in response to verification of the identity and owner of the at least one device by the at least one authenticator.

14. The computer program product of claim 13 wherein the one or more keys comprise a multi-purpose key used: (i) for validating the at least one device for secure onboarding; and (ii) as a network credential to provide the at least one device with the access to the secure communication channel.

15. The computer program product of claim 14 wherein the multi-purpose key is used as the network credential to provide the at least one device with the access to the secure communication channel only in connection with the secure onboarding of the at least one device.

16. The computer program product of claim 14 wherein the access comprises initial access to the secure communication channel in connection with the secure onboarding of the at least one device and additional access to the secure communication channel in connection with operations after the secure onboarding of the at least one device.

17. A method comprising:

performing, by an authentication server, a zero touch provisioning process which comprises:

receiving one or more credentials for at least one device from an onboarding management system, the one or more credentials comprising one or more keys which identify the at least one device and an owner of the at least one device;

receiving a request from at least one authenticator to authenticate the at least one device in response to the at least one device requesting access to a secure communication channel to communicate with the onboarding management system to perform a zero touch provisioning process; and transmitting the one or more credentials to the at least one authenticator in response to the request to cause the at least one authenticator to utilize the one or more credentials to verify the identity and the owner of the at least one device and provide the at least one device access to the secure communication channel in response to verification of the identity and owner of the at least one device by the at least one authenticator.

18. The method of claim 17 wherein the one or more keys comprise a multi-purpose key used: (i) for validating the at least one device for secure onboarding; and (ii) as a network credential to provide the at least one device with the access to the secure communication channel.

19. The method of claim 18 wherein the multi-purpose key is used as the network credential to provide the at least one device with the access to the secure communication channel only in connection with the secure onboarding of the at least one device.

20. The method of claim 18 wherein the access comprises initial access to the secure communication channel in connection with the secure onboarding of the at least one device and additional access to the secure communication channel in connection with operations after the secure onboarding of the at least one device.

* * * * *